(12) United States Patent
Bennett et al.

(10) Patent No.: US 7,122,239 B2
(45) Date of Patent: *Oct. 17, 2006

(54) OPAQUE POLYESTER FILM CONTAINING A CYCLIC OLEFIN COPOLYMER (COC) WITH GOOD SURFACE ATTACHMENT, METHOD FOR PRODUCING THE SAME AND USE THEREOF

(75) Inventors: Cynthia Bennett, Alzey (DE); Gottfried Hilkert, Saulheim (DE); Stefan Bartsch, Wiesbaden (DE); Herbert Peiffer, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 199 days.

This patent is subject to a terminal disclaimer.

(21) Appl. No.: 10/332,758

(22) PCT Filed: Jul. 12, 2001

(86) PCT No.: PCT/EP01/08041

§ 371 (c)(1),
(2), (4) Date: Jan. 13, 2003

(87) PCT Pub. No.: WO02/08317

PCT Pub. Date: Jan. 31, 2002

(65) Prior Publication Data

US 2004/0028928 A1  Feb. 12, 2004

(30) Foreign Application Priority Data

Jul. 20, 2000  (DE) .................................. 100 35 328

(51) Int. Cl.
| B32B 7/08 | (2006.01) |
| B32B 27/20 | (2006.01) |
| B32B 27/30 | (2006.01) |
| B32B 27/36 | (2006.01) |
| B32B 37/15 | (2006.01) |

(52) U.S. Cl. .................... 428/141; 428/480; 428/483; 428/910; 525/165; 525/177

(58) Field of Classification Search ............... 428/480, 428/327, 304.4, 318.4, 910, 483, 482; 525/173, 525/174, 175, 177; 526/281, 280, 283; 264/288.4, 290.2
See application file for complete search history.

(56) References Cited

U.S. PATENT DOCUMENTS

| 3,520,959 A | 7/1970 | Busby |
| 3,607,818 A * | 9/1971 | Trubisky et al. ............. 524/377 |
| 3,820,939 A | 6/1974 | McKenna |
| 4,028,032 A | 6/1977 | Hebert |
| 4,214,035 A | 7/1980 | Heberger |
| 4,252,885 A | 2/1981 | McGrail et al. |
| 4,571,363 A * | 2/1986 | Culbertson et al. ......... 428/332 |
| 4,699,845 A * | 10/1987 | Oikawa et al. ............. 428/480 |
| 4,880,700 A * | 11/1989 | Charmot et al. ............ 428/337 |
| 5,354,595 A * | 10/1994 | Yamamoto et al. ......... 428/147 |
| 5,581,435 A * | 12/1996 | Kinoshita et al. ......... 361/301.5 |
| 5,985,437 A * | 11/1999 | Chappell et al. ............ 428/336 |
| 6,326,431 B1 * | 12/2001 | Peiffer et al. ............... 525/177 |
| 6,627,695 B1 * | 9/2003 | Murschall et al. .......... 524/513 |
| 6,635,340 B1 * | 10/2003 | Peiffer et al. ............ 428/308.4 |
| 6,641,924 B1 * | 11/2003 | Peiffer et al. ............... 428/480 |
| 6,896,941 B1 * | 5/2005 | Yoshida et al. .......... 428/32.18 |
| 2001/0029274 A1 * | 10/2001 | Murschall et al. ............ 524/93 |
| 2002/0033556 A1 * | 3/2002 | Rounsley ................. 264/288.8 |
| 2002/0160215 A1 * | 10/2002 | Peiffer et al. ............... 428/480 |
| 2003/0170476 A1 * | 9/2003 | Murschall et al. .......... 428/483 |
| 2003/0170479 A1 * | 9/2003 | Peiffer et al. ............... 428/515 |
| 2003/0180560 A1 * | 9/2003 | Peiffer et al. ............... 428/480 |
| 2003/0224190 A1 * | 12/2003 | Peiffer et al. ............... 428/480 |
| 2003/0224191 A1 * | 12/2003 | Peiffer et al. ............... 428/480 |
| 2004/0086732 A1 * | 5/2004 | Peiffer et al. ............... 428/480 |

FOREIGN PATENT DOCUMENTS

| DE | 109 224 | 7/1973 |
| DE | 2 353 347 | 5/1974 |
| DE | 237 070 A3 | 7/1986 |
| DE | 195 40 277 A1 | 5/1996 |
| EP | 0 144 878 A2 | 6/1985 |
| EP | 0 144 948 A2 | 6/1985 |
| EP | 0 156 464 A1 | 10/1985 |
| EP | 0 283 164 A2 | 9/1988 |
| EP | 0 296 620 A2 | 12/1988 |
| EP | 0 300 060 A1 | 1/1989 |
| EP | 0 360 201 A2 | 3/1990 |
| EP | 0 407 870 A2 | 1/1991 |
| EP | 0 485 893 A1 | 5/1992 |

(Continued)

OTHER PUBLICATIONS

Schimtz, Peter et al., "Films." Ullmann's Encyclopedia of Industrial Chemistry, 5th Ed., vol. A11 (1988), pp. 85-95, 108-110.*

(Continued)

Primary Examiner—Vivian Chen
(74) Attorney, Agent, or Firm—ProPat, L.L.C.

(57) ABSTRACT

The invention relates to an opaque, biaxially oriented polyester film comprising at least one base layer, characterized in that at least this base layer contains a cyclic olefin copolymer (COC) in a concnetration of 2 to 60 wt. % in relation to the base layer, the glass transition temperature of said cyclic olefin copolymer (COC) being 70 to 270° C.; and in that at least one surface is provided with a coupling agent.

24 Claims, No Drawings

FOREIGN PATENT DOCUMENTS

| | | |
|---|---|---|
| EP | 0 503 422 B1 | 9/1992 |
| EP | 0 602 964 A1 | 6/1994 |
| EP | 0 786 495 A2 | 7/1997 |
| EP | 0 795 399 A1 | 9/1997 |
| EP | 0 884 348 A2 | 12/1998 |
| EP | 0 976 548 A2 * | 2/2000 |
| EP | 1 068 949 A1 * | 1/2001 |
| EP | 1 132 418 A1 | 9/2001 |
| GB | 1 411 564 | 10/1975 |
| JP | 05-009319 * | 1/1993 |
| JP | 05-140349 * | 6/1993 |
| JP | 05-230253 * | 9/1993 |
| JP | 11-035717 * | 2/1999 |
| WO | WO 94/13476 A1 | 6/1994 |
| WO | WO 94/13481 A1 | 6/1994 |

OTHER PUBLICATIONS

Werner, Eberhard et al., "Polyester, Films." Encyclopedia of Polymer Science and Engineering, vol. 12 (1988), pp. 193-216.*

* cited by examiner

OPAQUE POLYESTER FILM CONTAINING A CYCLIC OLEFIN COPOLYMER (COC) WITH GOOD SURFACE ATTACHMENT, METHOD FOR PRODUCING THE SAME AND USE THEREOF

The present invention relates to an opaque, biaxially oriented polyester film which encompasses at least one layer which comprises a polyester and a cycloolefin copolymer (COC), and has at least one surface which has good adhesion to other polymer layers or metal layers, or printing inks. The invention further relates to the use of the polyester film, and also to the process for its production.

BACKGROUND OF THE INVENTION

Opaque, biaxially oriented polyester films are known.

DE-A 2 353 347 describes a process for producing a milky polyester film having one or more layers, which comprises preparing a mixture from particles of a linear polyester with from 3 to 27% by weight of a homopolymer or copolymer of ethylene or propylene, extruding the mixture as a film, quenching the film and biaxially orienting the film via orientation in directions running perpendicular to one another, and heat-setting the film. A disadvantage of this process is that regrind which arises during production of the film (essentially a mixture of polyester and ethylene or propylene copolymer) cannot be reused without discoloring or yellowing the film. This makes the process uneconomic. In addition, the roughness values of the film are markedly too high, giving it a very matt appearance (very low gloss), and this is undesirable for many applications.

EP-A 0 300 060 describes a single-layer polyester film which comprises, besides polyethylene terephthalate, from 3 to 40% by weight of a crystalline propylene polymer and from 0.001 to 3% by weight of a surface-active substance. The effect of the surface-active substance is to increase the number of vacuoles in the film and at the same time to reduce their size to the desired extent. This gives the film greater opacity and lower density. Here again, a residual disadvantage of the film is that regrind which arises during production of the film (essentially a mixture of polyester and propylene homopolymer) cannot be reused without yellow discoloration of the film. This makes the process uneconomic. In addition, the film has poor adhesion to printing inks and to reprographic and other functional layers, e.g. metal layers, and high roughness values, giving it a very matt appearance (very low gloss), and this is undesirable for many applications.

EP-A 0 360 201 describes a polyester film having at least two layers and comprising a base layer with fine vacuoles, with a density of from 0.4 to 1.3 kg/dm$^3$, and having at least one outer layer whose density is above 1.3 kg/dm$^3$. The vacuoles are achieved by adding from 4 to 30% by weight of a crystalline propylene polymer, followed by biaxial stretching of the film. The additional outer layer improves the ease of production of the film (no streaking on the film surface), and the surface tension is increased (and the contact angle and the roughness of the laminated surface can be reduced). Here again, a disadvantage is that regrind arising during production of the film (essentially a mixture of polyester and propylene homopolymer) cannot be reused without yellow discoloration of the film. This makes the process uneconomic. In addition, the film still has poor adhesion to printing inks, polymer layers, and metal layers, and its roughness values are too high, giving it a matt appearance (low gloss), and this is undesirable for many applications.

EP-A 0 795 399 describes a polyester film having at least two layers and comprising a base layer with fine vacuoles, the density of which is from 0.4 to 1.3 kg/dm$^3$, and having at least one outer layer, the density of which is greater than 1.3 kg/dm$^3$. The vacuoles are achieved by adding from 5 to 45% by weight of a thermoplastic polymer to the polyester in the base, followed by biaxial stretching of the film. The thermoplastic polymers used are, inter alia, polypropylene, polyethylene, polymethylpentene, polystyrene or polycarbonate, and the preferred thermoplastic polymer is polypropylene. As a result of adding the outer layer, ease of production of the film is improved (no streaking on the film surface), the surface tension is increased and the roughness of the laminated surface can be matched to prevailing requirements. Further modification of the film in the base layer and/or in the outer layers, using white pigments (generally TiO$_2$) and/or using optical brighteners, permits the properties of the film to be matched to the prevailing requirements of the application. Here again, however, a residual disadvantage is that regrind which arises during production of the film (essentially a mixture of polyester and the added polymer) cannot be reused without undefined change in the color of the film, and this is undesirable for many applications. This makes the process uneconomic. In addition, the film has poor adhesion to printing inks, and to reprographic and other functional layers, e.g. metal layers, and its roughness values are too high, giving it a matt appearance (low gloss), and this is undesirable for many applications.

DE-A 195 40 277 describes a polyester film having one or more layers and comprising a base layer with fine vacuoles, with a density of from 0.6 to 1.3 kg/dm$^3$, and having planar birefringence of from −0.02 to 0.04. The vacuoles are achieved by adding from 3 to 40% by weight of a thermoplastic resin to the polyester in the base layer, followed by biaxial stretching of the film. The thermoplastic resins used are, inter alia, polypropylene, polyethylene, polymethylpentene, cyclic olefin polymers, polyacrylic resins, polystyrene or polycarbonate, preferred polymers being polypropylene and polystyrene. By maintaining the stated limits for the birefringence of the film, the film claimed has in particular superior tear strength and superior isotropy properties. However, a residual disadvantage is that regrind arising during production of the film cannot be reused without undefined change in the color of the film, and this is undesirable for many applications. This makes the process uneconomic. In addition, the film has poor adhesion to printing inks, and to reprographic and other functional layers, e.g. metal layers, and its roughness values are too high, giving it a matt appearance (low gloss), and this is undesirable for many applications.

EP-A 0 144 878 describes films with a copolyester coating, which have good adhesion to metals. Although the films which it describes have good adhesion to metals, they are also non-opaque.

EP-A 0 144 948 describes films with a crosslinked acrylic adhesion-promoter coating, which have good adhesion to the light-sensitive reprographic coatings. Although the films which it describes have good reprographic adhesion and recyclability, they are also non-opaque.

EP-A 0 884 348 describes films with an adhesion-promoter layer, which have good adhesion to water-soluble or hydrophilic layers. Although the films which it describes have good adhesion to layers applied using aqueous systems, they are non-opaque.

The object of the present invention therefore was to provide an opaque polyester film which has high gloss, and in particular good adhesion to other layers and improved ease of production, i.e. low production costs, without at the same time having the abovementioned disadvantageous properties. In particular, it is intended that regrind arising directly during the production process should be capable of regenerating in a concentration which is preferably from 10 to 70% by weight, based on the total weight of the film, without any significant resultant adverse effect on the physical properties of the film. In particular, the addition of regrind is intended not to produce any significant discoloration or yellowing of the film.

BRIEF DESCRIPTION OF THE INVENTION

The object is achieved by means of an opaque, biaxially oriented polyester film with at least one base layer, where the base layer comprises a cycloolefin copolymer (COC). The concentration of the COC is preferably from 2 to 60% by weight, based on the weight of the base layer. The glass transition temperature of the cycloolefin copolymer (COC) is preferably in the range from 70 to 270° C. At least one surface of the film of the invention has adhesion promoter.

DETAILED DESCRIPTION OF THE INVENTION

For the purposes of the present invention, an opaque, biaxially oriented polyester film is a film whose light scattering is sufficiently strong as to make patterns lying thereunder indiscernible. The opacity of the film of the invention is more than 55%, preferably more than 60%, and particularly preferably more than 65%.

For the purposes of the present invention, the opaque, biaxially oriented polyester films are generally white. For the purposes of the present invention, a white, biaxially oriented polyester film is a film of this type which has whiteness of more than 70%, preferably more than 75%, and particularly preferably more than 80%.

To achieve the desired opacity of the film of the invention, the amount of cycloolefin copolymer (COC) in the base layer B should preferably be greater than 2% by weight, otherwise the opacity is below 55%. If, on the other hand, the content of cycloolefin copolymer (COC) is greater than 60% by weight it becomes impossible to produce the film cost-effectively, since reliable stretching of the film becomes impossible.

It is also preferable for the glass transition temperature of the cycloolefin copolymer (COC) used to be above 70° C. Otherwise, (if the glass transition temperature is below 70° C.) the raw material mixture sometimes has poorer processability (poorer extrudability), and the desired whiteness is sometimes lost, and the regrind used gives a film with a tendency toward increased yellowing. If, on the other hand, the glass transition temperature of the selected cycloolefin copolymer (COC) is above 270° C. it becomes impossible in some cases to achieve adequate homogenization of the raw material mixture in the extruder. This then results in a film with undesirably inhomogeneous properties.

In the preferred embodiment of the film of the invention, the glass transition temperature of the COCs used is in a range from 90 to 250° C., and in the particularly preferred embodiment it is in a range from 110 to 220° C.

Surprisingly, it has been found that the addition of a cycloolefin copolymer (COC) in the manner described above can produce an opaque glossy, film.

The whiteness and the opacity of the film can be adjusted precisely and adapted to the prevailing requirements as a function of the amount and the nature of the cycloolefin copolymer (COC) added. By using this measure it is possible to dispense substantially with any use of other familiar whitening and opacifying additives. It was also very surprising that the surface roughness of the film is substantially lower, and therefore the gloss of the film is substantially higher, than is the case with comparable films of the prior art. An additional and entirely surprising effect was moreover that the regrind does not, like the polymeric additives of the prior art, tend to cause yellow discoloration.

None of these features described was foreseeable. All the more so, since, for example, although COCs appear to be substantially incompatible with the preferred polyester polyethylene terephthalate they are known to be oriented using stretching conditions and stretching temperatures which are similar to those for polyethylene terephthalate. In these circumstances the skilled worker would not have expected to be able to produce an opaque film with high gloss under these production conditions.

Particularly in the preferred and the particularly preferred embodiments, the film of the invention has high and, respectively, particularly high whiteness and high and, respectively, particularly high opacity, while the change of film color resulting from regrind addition remains extremely small.

The film of the invention is a single- or multilayer film. The structure of single-layer embodiments is as for the COC-containing layer described below. Multilayer embodiments have at least two layers and always encompass the COC-containing layer and at least one other layer. The COC-containing layer here is the base layer but may also form the intermediate layer or the outer layer of the multilayer film. In one preferred embodiment, the COC-containing layer forms the base layer of the film with at least one outer layer or preferably with outer layers on both sides, and, where appropriate, there may be (an) intermediate layer(s) present on one or both sides. An example of the layer structure of the film is then A-B-C, B being the base layer and A and C being the outer layers, which may be identical or different. In another preferred embodiment, the COC-containing layer also forms an intermediate layer of the multilayer film. Other embodiments with COC-containing intermediate layers have a five-layer structure with, alongside the COC-containing base layer, COC-containing intermediate layers on both sides. In another embodiment, in addition to the base layer, the COC-containing layer may form (an) outer layer(s) on one side or both sides, on the base layer or intermediate layer. For the purposes of the present invention, the base layer is the layer which makes up from 50 to 100%, preferably from 70 to 90%, of the entire thickness of the film. The outer layers are the layers which form the outermost layers of the film.

Each embodiment of the invention is a non-transparent, opaque film. For the purposes of the present invention, non-transparent films are films whose light transmittance to ASTM D1003-77 is below 95%, preferably below 75%.

The COC-containing layer (the base layer) of the film of the invention comprises a thermoplastic polyester, preferably a homopolyester, a COC, and, where appropriate, other additives, each in effective amounts. This layer generally comprises at least from 20 to 98% by weight, preferably from 40 to 98% by weight, in particular from 70 to 98% by weight, of thermoplastic polyester, based on the weight of the layer.

Suitable thermoplastic polyesters for the base layer are preferably polyesters made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclohexane and terephthalic acid (=poly-1,4-cyclohexanedimethylene terephthalate, PCDT), or else from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters composed of at least 90 mol %, preferably at least 95 mol %, of ethylene glycol units and terephthalic acid units or ethylene glycol units and naphthalene-2,6-dicarboxylic acid units. The remaining monomer units are derived from other aliphatic, cycloaliphatic, or aromatic diols and, respectively, dicarboxylic acids, for example those which may occur in the layer A (A=outer layer 1) or in the layer C(C=outer layer 2) of a multilayer film ABC (B=base layer).

Examples of other suitable aliphatic diols are diethylene glycol, triethylene glycol, aliphatic glycols of the formula HO—(CH$_2$)$_n$—OH, where n is an integer from 3 to 6 (in particular 1,3-propanediol, 1,4-butanediol, 1,5-pentanediol, and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols are those of the formula HO—C$_6$H$_4$—X—C$_6$H$_4$—OH, where X is —CH$_2$—, —C(CH$_3$)$_2$—, —C(CF$_3$)$_2$—, —O—, —S— or —SO$_2$—. Bisphenols of the formula HO—C$_6$H$_4$—C$_6$H$_4$—OH are also highly suitable.

Other preferred aromatic dicarboxylic acids are benzenedicarboxylic acids, naphthalenedicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid), and stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the (C$_3$–C$_{19}$)-alkanedioic acids are particularly suitable, where the alkane moiety may be straight-chain or branched.

An example of a method for preparing the polyester is the transesterification process. The starting materials here are dicarboxylic esters and diols, and these are reacted using the usual transesterification catalysts, such as salts of zinc, of calcium, of lithium, of magnesium or of manganese. The intermediates are then polycondensed in the presence of typical polycondensation catalysts, such as antimony trioxide or titanium salts. They may equally well be prepared by the direct esterification process in the presence of polycondensation catalysts, starting directly from the dicarboxylic acids and the diols.

According to the invention, the COC-containing layer, or the film in single-layer embodiments, comprises an amount of not less than 2.0% by weight, preferably from 4 to 50% by weight and particularly preferably from 6 to 40% by weight, of a cycloolefin copolymer (COC), based on the weight of the layer comprising COC or, in the case of single-layer embodiments, based on the weight of the film. It is significant for the present invention that the cycloolefin copolymer (COC) is not compatible with the thermoplastic polyester, for example polyethylene terephthalate, and does not form a homogeneous mixture with the same in the melt.

Cycloolefin polymers are generally homopolymers or copolymers which contain polymerized cycloolefin units and, if desired, acyclic olefins as comonomer. Cycloolefin polymers suitable for the present invention contain from 0.1 to 100% by weight, preferably from 10 to 99% by weight, particularly preferably from 50 to 95% by weight, of polymerized cycloolefin units, in each case based on the total weight of the cycloolefin polymer. Particular preference is given to polymers which have been built up using the monomers comprising the cyclic olefins of the formulae I, II, III, IV, V or VI:

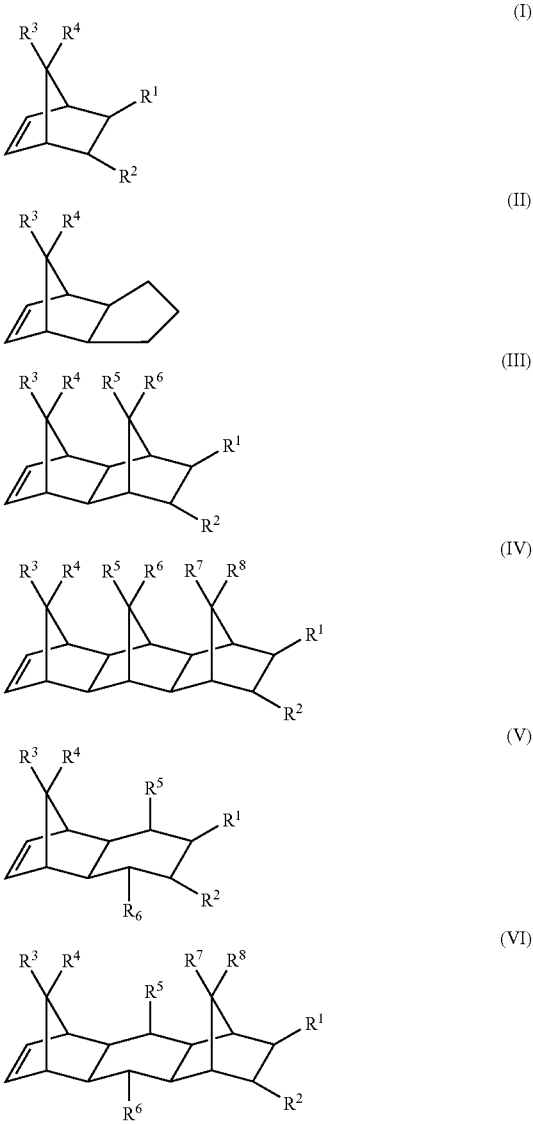

R$^1$, R$^3$, R$^3$, R$^4$, R$^5$, R$^6$, R$^7$ and R$^8$ these formulae independent of one another and are identical or different, and are a hydrogen atom or a C$_1$–C$_{30}$-hydrocarbon radical, or two or more of the radicals R$^1$ to R$^8$ have cyclic bonding, and the same radicals in the different formulae may have the same or a different meaning. Examples of C$_1$–C$_{30}$-hydrocarbon radicals are linear or branched C$_1$–C$_8$-alkyl radicals, $C_6$–$C_{18}$-aryl radicals, $C_7$–$C_{20}$-alkylenearyl radicals and cyclic $C_3$–$C_{20}$-alkyl radicals and acyclic $C_2$–$C_{20}$-alkenyl radicals.

If desired, the cycloolefin polymers may contain from 0 to 45% by weight, based on the total weight of the cycloolefin polymer, of polymerized units of at least one monocyclic olefin of the formula VII:

(VII)

n here is a number from 2 to 10.

If desired, the cycloolefin polymers may contain from 0 to 99% by weight, based on the total weight of the cycloolefin polymer, of polymerized units of an acyclic olefin of the formula VIII:

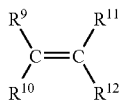
(VIII)

$R^9$, $R^{10}$, $R^{11}$ and $R^{12}$ here are independent of one another and are identical or different, and are a hydrogen atom or a $C_1$–$C_{10}$-hydrocarbon radical, e.g. a $C_1$–$C_8$-alkyl radical or a $C_6$–$C_{14}$-aryl radical.

Other polymers suitable in principle are cycloolefin polymers which are obtained by ring-opening polymerization of at least one of the monomers of the formulae I to VI, followed by hydrogenation.

Cycloolefin homopolymers have a structure composed of one monomer of the formulae I to VI. These cycloolefin polymers are less suitable for the purposes of the present invention. Polymers suitable for the purposes of the present invention are cycloolefin copolymers (COC) which comprise at least one cycloolefin of the formulae I to VI and at least one comonomer. Preferred comonomers are the acyclic olefins of the formula VIII. These cycloolefin copolymers which can be used according to the invention are termed COCs above and below. Acyclic olefins preferred here are those which have from 2 to 20 carbon atoms, in particular unbranched acyclic olefins having from 2 to 10 carbon atoms, for example ethylene, propylene and/or butylene. The proportion of polymerized units of acyclic olefins of the formula VIII is up to 99% by weight, preferably from 5 to 80% by weight, particularly preferably from 10 to 60% by weight, based on the total weight of the respective cycloolefin copolymer.

Among the cycloolefin copolymers, those which are particularly preferred contain polymerized units of polycyclic olefins having a fundamental norbornene structure, particularly preferably norbornene, 5-methylnorbonene or tetracyclododecene. Other suitable monomers are dimethyloctahydronapthalene and cyclopentene. Particular preference is also given to cycloolefin copolymers (COCs) which contain polymerized units of acyclic olefins, in particular ethylene. Particular preference is in turn given to norbornene-ethylene copolymers and tetracyclododecene-ethylene copolymers which in each case contain from 5 to 80% by weight, preferably from 10 to 60% by weight, of acrylic olefin (based on the weight of the copolymer).

The cycloolefin polymers described above generally have glass transition temperatures from −20 to 400° C. However, cycloolefin copolymers (COCs) which can be used for the invention have a glass transition temperature above 70° C., preferably above 90° C. and in particular above 110° C. The viscosity number (decalin, 135° C., DIN 53 728) is advantageously from 0.1 to 200 ml/g, preferably from 50 to 150 ml/g.

The cycloolefin copolymers (COCs) are prepared by heterogeneous or homogeneous catalysis with organometallic compounds, as described in a wide variety of documents. Suitable catalyst systems based on mixed catalysts made from titanium compounds or vanadium compounds in conjunction with aluminum organyl compounds are described in DD 109 224, DD 237 070 and EP-A-0 156 464. EP-A-0 283 164, EP-A-0 407 870, EP-A-0 485 893 and EP-A-0 503 422 describe the preparation of cycloolefin copolymers (COCs) with catalysts based on soluble metallocene complexes. The preparation processes for cycloolefin polymers described in the abovementioned specifications are expressly incorporated herein by way of reference.

The cycloolefin copolymers are incorporated into the film either in the form of pellets of pure material or in the form of pelletized concentrate (masterbatch), by premixing the polyester pellets or polyester powder with the cycloolefin copolymer (COC) or with the cycloolefin copolymer (COC) masterbatch, followed by feeding to an extruder. In the extruder, the mixing of the components continues and they are heated to the processing temperature. It is advantageous for the process of the invention if the extrusion temperature is above the glass transition temperature $T_g$ of the cycloolefin copolymer (COC), generally above the glass transition temperature $T_g$ of the cycloolefin copolymer (COC) by at least 5° C., preferably by from 10 to 180° C., in particular by from 15 to 150° C.

For the intermediate layers and for the outer layers it is in principle possible to use the polymers used for the base layer. The outer layers may preferably be composed of a mixture of polymers, of a copolymer, or of a homopolymer, which contain ethylene 2,6-naphthalate units and ethylene terephthalate units. Up to 30 mol % of the polymers may be composed of other comonomers (e.g. ethylene isophthalate units).

The base layer and the other layers may also comprise conventional additives, such as stabilizers, antiblocking agents, and other fillers. They are advantageously added to the polymer or polymer mixture before melting begins. Examples of stabilizers used are phosphorus compounds, such as phosphoric acid or phosphoric esters.

Typical antiblocking agents (in this context also termed pigments) are inorganic and/or organic particles, such as calcium carbonate, amorphous silica, formed silica, spherical silicon dioxide particles, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin or crosslinked polymer particles, e.g. polystyrene particles or acrylate particles.

The additives selected may also comprise mixtures of two or more different antiblocking agents or mixtures of antiblocking agents of the same composition but different particle sizes. The particles may be added to the polymers of the individual layers of the film in the respective advantageous amounts, e.g. as a glycolic dispersion during the polycondensation or via masterbatches during extrusion. Pigment concentrations which have proven particularly suitable are from 0 to 25% by weight (based on the weight of the respective layer). EP-A-0 602 964, for example, describes the antiblocking agents in detail.

If the color desired for the opaque film of the invention is other than white, the desired shade can be achieved by incorporating colorants or colorant mixtures into the polyester. Use may be made either of soluble dyes or of insoluble color pigments.

According to the invention, at least one surface of the film has been treated so that the contact angle with respect to water is ≦64°, preferably ≦62°, particularly preferably ≦600. This is preferably achieved via corona- or flame-treatment, usually following the heat-setting of the film. The treatment may also take place at other points in the film-production process, for example prior to or after longitudinal stretching. As an alternative to, or in addition to, the surface treatment described above, at least one surface of the film may be given a functional coating so that the coating on the finished film has a thickness of from 5 to 2000 nm, preferably from 20 to 500 nm, in particular from 30 to 200 nm. The coating is preferably applied in-line, i.e. during the film-production process, advantageously prior to transverse stretching. Application by reverse gravure-roll coating is particularly preferred, and this can apply the coatings extremely uniformly in layer thicknesses up to 100 nm. Preference is also given to application by Meyer rod, which can achieve relatively high coating thicknesses. The coatings are preferably applied in the form of solutions, suspensions, or dispersions, particularly preferably as an aqueous solution, suspension, or dispersion. The coatings mentioned give the film surface an additional function, for example making the film sealable, printable, metallizable, sterilizable, or antistatic, or improving its aroma barrier, for example, or permitting adhesion to materials which would not otherwise adhere to the film surface (e.g. photographic emulsions). Examples of substances/compositions which provide additional functionality are: acrylates, for example as described in WO 94/13476, ethylvinyl alcohols, PVDC, waterglass ($Na_2SiO_4$), hydrophilic polyester (PET/IPA polyesters containing the Na salt of 5-sulfoisophthalic acid, e.g. as described in EP-A-0 144 878, U.S. Pat. No. 4,252,885, or EP-A-0 296 620), polyvinyl acetates, e.g. as described in WO 94/13481, polyvinyl acetates, polyurethanes, the alkali metal or alkaline earth metal salts of $C_{10}$–$C_{18}$ fatty acids, butadiene copolymers with acrylonitrile or methyl methacrylate, methacrylic acid, acrylic acid, or esters of these.

The substances/compositions mentioned are applied in the form of dilute solution, emulsion or dispersion, preferably in the form of an aqueous solution, emulsion, or dispersion, to one or both surfaces of the film, and the solvent is then evaporated. If the coatings are applied in-line prior to transverse stretching, the heat treatment in transverse stretching and subsequent heat-setting is usually sufficient to evaporate the solvent and dry the coating. The dried coatings then have thicknesses of from 5 to 2000 nm, preferably from 20 to 500 nm, in particular from 30 to 200 nm.

In one preferred embodiment of the invention, a copolyester coating is used to achieve the improved adhesion. The preferred coating copolyesters are prepared by polycondensing (α) isophthalic acid, (β) an aliphatic dicarboxylic acid having the formula HOOC$(CH_2)_n$COOH, where n is in the range from 1 to 11, (γ) a sulfomonomer containing an alkali metal sulfonate group on the aromatic moiety of an aromatic dicarboxylic acid, and (δ) at least one aliphatic or cycloaliphatic alkylene glycol having from about 2 to 11, preferably from about 2 to 8, particularly preferably from 2 to 6, carbon atoms.

The total number of molar equivalents of dicarboxylic acid present are to be substantially the same as the total number of diol molar equivalents present.

It has been found that the relative proportions of components α, β, γ, and δ used to prepare the preferred copolyester coatings are a decisive factor for achieving a coated film with satisfactory adhesion. It is therefore preferable for, for example, isophthalic acid (component α) to be present as acid component at at least about 65 mol %. Component α is preferably pure isophthalic acid, the amount present being from about 70 to 95 mol %. In the case of component β, any acid of the formula mentioned gives satisfactory results, but preference is given to adipic acid, azelaic acid, sebacic acid, malonic acid, succinic acid, glutaric acid, and mixtures of these acids. The desired amount within the range given is preferably from 1 to 20 mol %, based on the acid components of the copolyester, if component β is present in the composition. In this system, the amount present of the monomer forming component γ of the preferred copolyester coating should preferably be at least 5 mol %, to make the base-coat water-dispersible. The amount of monomer of component γ is particularly preferably from about 6.5 to 12 mol %. The amount of the glycol component (δ) present is approximately stoichiometric.

In another preferred embodiment of the invention, an acrylate coating is used to achieve the improved adhesion. The acrylic copolymers preferably used are substantially composed of at least 50% by weight of one or more polymerizable acrylic and/or methacrylic monomers and from 1 to 15% by weight of a copolymerizable comonomer which in the copolymerized state is capable of bringing about intermolecular crosslinking on exposure to an elevated temperature, where appropriate without addition of any separate resinous crosslinker.

The amount preferably present of the acrylic component of the adhesion-promoter copolymers is from 50 to 99% by weight, preferably composed of an ester of methacrylic acid, in particular of an alkyl ester whose alkyl group contains up to 10 carbon atoms, examples being the methyl, ethyl, n-propyl, isopropyl, n-butyl, isobutyl, tert-butyl, hexyl, 2-ethylhexyl, heptyl, and n-octyl group. When acrylic copolymers derived from a lower alkyl acrylate ($C_1$–$C_4$), in particular ethyl acrylate, are used together with a lower alkyl methacrylate they give particularly good adhesion between the polyester film and reprographic or matt coatings applied thereto. Very particular preference is given to adhesion-promoter copolymers composed of an alkyl acrylate, e.g. ethyl acrylate or butyl acrylate, together with an alkyl methacrylate, e.g. methyl methacrylate, in particular in equal molar fractions and in a total amount of from 70 to 95% by weight. The amount present of the acrylate comonomer of these acrylic/methacrylic combinations is preferably from 15 to 65 mol %, and the fraction present of the methacrylate comonomer is preferably greater than the fraction of the acrylate comonomer generally by from 5 to 20 mol %. The proportion of the methacrylate present in the combination is preferably from 35 to 85 mol %.

To increase solvent resistance use may be made, where appropriate, of comonomers suitable for bringing about crosslinking, e.g. N-methylolacrylamide, N-methylolacrylamide, and the corresponding ethers; epoxy materials, e.g. glycidyl acrylate, glycidyl methacrylate, and allyl glycidyl ether; monomers containing carboxy groups, e.g. crotonic acid, itaconic acid or acrylic acid; anhydrides, e.g. maleic anhydride or itaconic anhydride; monomers containing hydroxy groups, e.g. allyl alcohol and hydroxyethyl or hydroxypropyl acrylate or hydroxyethyl or hydroxypropyl methacrylate; amides, such as acrylamide, methacrylamide, or maleamide, and isocyanates, such as vinyl isocyanate or allyl isocyanate. Among the abovementioned crosslinking comonomers, preference is given to N-methylolacrylamide and N-methylolmethacrylamide, specifically and primarily because copolymer chains which contain one of these monomers are capable of condensing with one another when exposed to elevated temperatures, and therefore of bringing about the desired intermolecular crosslinking. However, any solvent resistance desired from the preferred acrylate coating may also be achieved via the presence of a foreign crosslinker, e.g. of a melamine-formaldehyde condensation product or urea-formaldehyde condensation product. If no solvent resistance is needed, crosslinkers can be omitted.

The preferred acrylate coating may be applied to one or both sides of the film. However, it is also possible to provide just one side of the film with the coating of the invention, and to apply another coating to the other side. The mixing specification for the coating may comprise known additives, e.g. antistats, wetting agents, surfactants, pH regulators, antioxidants, dyes, pigments, antiblocking agents, e.g. colloidal $SiO_2$, etc. It is usually appropriate to incorporate a surfactant in order to increase the capability of the aqueous coating to wet the polyester backing film.

In another preferred embodiment of the invention, a water-soluble or hydrophilic coating is used to achieve improved adhesion to hydrophilic layers or printing inks. The preferred hydrophilic coating may be achieved in three ways, i.e. using
1. a mixture of an aromatic polyester (I-1) having a water-dispersible functional group and a polyvinyl alcohol (II-1);
2. a mixture of an aromatic copolyester (I-2) having a water-dispersible functional group and a polyglycerol polyglycidyl ether (II-2), or
3. a mixture of an aqueous polyurethane (I-3) and a polyvinyl alcohol (II-3).

The aromatic copolyesters (I-1 and I-2) are produced from aromatic dicarboxylic acids, such as terephthalic acid, 2,6-naphthalenedicarboxylic acid, or isophthalic acid, and from, where appropriate, branched or condensed aliphatic diols, such as ethylene glycol, diethylene glycol, 2-methylpropanol, or 2,2-dimethylpropanol, and also an ester-forming compound which bears a water-dispersible functional group. Examples of the functional groups are: hydroxy groups, carboxy groups, sulfonic acid groups or phosphoric acid groups or salts of these. Preference is given to sulfonic salts and carboxylic salts. Any polyvinyl alcohol which is water-soluble and can be prepared using normal polymerization techniques may be used as polyvinyl alcohol component (II-1 and II-3). These polyvinyl alcohols are generally prepared by hydrolyzing polyvinyl acetates. The degree of hydrolysis should preferably be at least 70%, but more preferably from 80 to 99.9%. The polyglycerol polyglycidyl ethers (II-2) used comprise reaction products of glycerol and epichlorohydrin with molecular weights of from about 250 to 1200. The aqueous polyurethane (I-3) is produced from a polyol, such as polyesters having glycol end groups, polyoxyethylene glycol, polyoxypropylene glycol, polyoxytetramethylene glycol, or acrylic polyols, and from a diisocyanate, such as xylene diisocyanate, hexamethylene diisocyanate, dicyclohexylmethane 4,4'-diisocyanate, toluidine diisocyanate, phenylene diisocyanate, diphenylmethane 4,4'-diisocyanate, and naphthalene 1,5-diisocyanate.

The preferred copolyester coatings, acrylate coatings and hydrophilic coatings may also comprise other known additives, e.g. antistats, wetting agents, surfactants, pH regulators, antioxidants, dyes, pigments, antiblocking agents, e.g. colloidal $SiO_2$, etc.

The total thickness of the film can vary within wide limits and depends on the intended application. The preferred embodiments of the film of the invention have total thicknesses from 4 to 400 µm, preferably from 8 to 300 µm, in particular from 10 to 300 µm. The thickness(es) of any intermediate layer(s) present is/are generally from 0.5 to 15 µm, independently of each other, and preference is given to intermediate layer thicknesses of from 1 to 10 µm, in particular from 1 to 8 µm. The values given are each based on one intermediate layer. The thickness(es) of the outer layer(s) is/are selected independently of the other layers and is/are preferably in the range from 0.1 to 10 µm, in particular from 0.2 to 5 µm, with preference from 0.3 to 2 µm, and outer layers applied to both sides may have identical or different thickness and composition. The thickness of the base layer is correspondingly given by the difference between the total thickness of the film and the thickness of the outer layer(s) and intermediate layer(s) applied, and can therefore, like the total thickness, vary within wide limits.

The invention also provides a process for producing the polyester film of the invention by extrusion or coextrusion methods known per se.

The procedure for this process is that the melts corresponding to individual layers of the film are extruded/coextruded through a flat-film die, the resultant film is drawn off on one or more rollers for solidification, the film is then biaxially stretched (oriented), and the biaxially stretched film is heat-set and, where appropriate, corona- or flame-treated on the surface intended for treatment, and, where appropriate, given a functional coating either in the course of the process or subsequently off-line.

The biaxial stretching is usually carried out sequentially. For this, it is preferable to begin by stretching longitudinally (i.e. in the machine direction=MD) and then to stretch transversely (i.e. perpendicularly to the machine direction=TD). This orients the molecular chains. The longitudinal stretching preferably takes place with the aid of two rollers rotating at different peripheral speeds corresponding to the desired stretching ratio. For the transverse stretching, use is generally made of an appropriate tenter frame.

Simultaneous stretching of the film of the invention in the two directions (MD and TD) with the aid of a tenter frame suitable for this purpose has not proven advantageous. Specifically, this stretching method given a film whose whiteness and opacity are too low.

The temperature at which the stretching is carried out may vary within a relatively wide range, and depends on the desired properties of the film. The longitudinal stretching is generally carried out at from 80 to 130° C., and the transverse stretching at from 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1.

In the heat-setting which follows, the film is held at a temperature of from about 150 to 250° C. for from about 0.1 to 10 s. The film is then cooled and is wound up in the usual manner.

The inventive coatings which may be present may be applied to the oriented opaque polyester film by the coating processes known and used in the field of film production. Examples of the methods of coating are roller coating, spray coating, application by slot casting, or dip coating. The opaque polyester film is preferably coated using gravure rollers by the reverse gravure process. Prior to coating, the film surface is preferably subjected to corona treatment in a corona discharge apparatus, as described in U.S. Pat. Nos. 3,520,959, 3,820,939, and 4,028,032. The corona treatment makes the thermoplastic film surface less hydrophobic, permitting better wetting of the surface by the aqueous coating. This improves the adhesion of the coating to the film surface.

The coating may be applied to the thermoplastic film in-line at any stage of film production, and specifically at the stage prior to stretching at the juncture between the casting of the amorphous film and the first stretching process, for example as described in GB-B 1 411 564, or at the stage between the stretching procedures, i.e. after the monoaxial stretching but prior to the biaxial stretching, for example as described in U.S. Pat. No. 4,214,035. The heat introduced to the film during the stretching or during the subsequent conditioning stages is normally sufficient to drive the water and/or other volatile constituents out of the coating and dry the coating. The coating may also be applied (off-line) to the finished biaxially oriented film after the stretching procedures. This type of application process mostly requires a separate drying step.

The particular advantage of the film of the invention is seen in good adhesion to other materials and in high opacity. Surprisingly, the gloss of the film was also very high. The opacity of the film of the invention is above 55%, preferably above 60%, and particularly preferably above 65%. The gloss of the film of the invention is more than 50, preferably more than 70, and particularly preferably more than 90.

Another advantage of the invention is that regrind arising directly during production of the film can be re-used at a concentration of from 10 to 70% by weight, based on the total weight of the film, without any significant resultant adverse effect on the physical properties of the film produced. In particular, the regrind (substantially composed of polyester and cycloolefin copolymer (COC)) does not cause undefined change in film color, whereas this is always the case with prior-art films.

A further advantage of the invention is that the production costs of the film of the invention are comparable with those for conventional prior-art transparent films. The other properties of the film of the invention relevant to its processing and use remain substantially unchanged, or indeed have been improved.

The film has very good suitability for interior surfacings, for the construction of exhibition stands, and for exhibition requisites, for protective coverings on machinery and on vehicles, and other moldings, and also for the packaging of foods and other consumable items which are sensitive to light and/or to air. It also has excellent suitability for industrial use, e.g. in the production of hot-stamping foils, or as a label film. The film is naturally also particularly suitable for image-recording papers, printed sheets, or magnetic recording cards, to mention just a few possible applications. The good adhesion to printing inks, metal layers, and other coatings is particularly advantageous in these applications.

The film has outstandingly good processing and winding performance in particular on high-speed machinery (winders, metallizers, printing machines or laminating machines). One measure of processing performance is the coefficient of friction of the film, and this is below 0.6. A good thickness profile, excellent layflat, and low coefficient of friction affect winding performance, and the roughness of the film has a decisive effect on winding performance. It has been found that the winding of the film of the invention is particularly good when the average roughness is in a range from 50 to 2500 nm while the other properties are retained. Methods of varying the roughness include varying the COC concentration and the process parameters during the production process, within the range given.

The table below (Table 1) gives a further summary of the most important film properties of the invention:

TABLE 1

| | Inventive range | Preferred | particularly preferred | Unit | Test method |
|---|---|---|---|---|---|
| Formulation | | | | | |
| Concentration of cycloolefin copolymer (COC) in base layer | 2–60 | 4–50 | 6–40 | % by weight, based on base layer | |
| Glass transition temperature of cycloolefin copolymer (COC) | 70–270 | 90–250 | 110–220 | ° C. | DIN 73 765 |
| Film properties | | | | | |
| Contact angle, water | ≦64 | ≦62 | ≦60 | ° | see Description |
| Opacity | >55 | >60 | >65 | % | DIN 53 146 |
| Gloss | >50 | >70 | >90 | | DIN 67 530 |
| COF | <0.6 | <0.55 | <0.5 | | DIN 53 375 |
| Average roughness $R_a$ | 50–300 | 60–250 | 70–200 | nm | DIN 4768, cut-off of 0.25 mm |

The following measured values were used to characterize the raw materials and the films:

SV (Standard Viscosity)

Standard viscosity SV (DCA) is measured by a method based on DIN 53726 in dichloroacetic acid, at 25° C. SV (DCA)=($\eta_{rel}$−1)×1000.

Intrinsic viscosity (IV) in dl/g is calculated as follows from standard viscosity

IV (DCA)=6.67·10$^{-4}$ SV (DCA)+0.118

Coefficient of Friction (COF)

Coefficient of friction was determined to DIN 53 375. The coefficient of sliding friction was measured 14 days after production.

Black Marker Test

This test serves to check the coating quality of acrylate-coated films. The film marker (trade mark: black ink marker—Sanford EXPO Dry Erase Marker) is used to apply an ink mark across the entire width of the specimens on the coated side of the film. This ink mark has to dry for 2 minutes, and then it is rubbed off the coated side of the film, using paper tissues. A slight color residue has to be still visible after the ink mark has been rubbed off. Complete rub-off of the ink mark is unacceptable. If a color residue of this type remains the assessment is good, otherwise the assessment is poor.

Roughness

Roughness $R_a$ of the film was determined to DIN 4768 with a cut-off of 0.25 mm.

Whiteness and Opacity

Whiteness and opacity were determined with the aid of the "®ELREPHO" electrical reflectance photometer from Zeiss, Oberkochem (DE), standard illuminant C, 2° standard observer. Opacity is determined to DIN 53 146. Whiteness is defined as W=RY+3RZ−3RX. W=whiteness, and RY, RZ and RX=relevant reflection factors when the Y, Z or X color-measurement filter is used. The white standard used was a barium sulfate pressing (DIN 5033, Part 9). An example of a detailed description is given in Hansl Loos "Farbmessung" [Color Measurement], Verlag Beruf und Schule, Itzehoe (1989).

Light Transmittance

Light transmittance is measured using a method based on ASTM D1033-77.

Gloss

Gloss was determined to DIN 67 530. The reflectance was measured as an optical value characteristic of a film surface. Based on the standards ASTM-D 523-78 and ISO 2813, the angle of incidence was set at 60°. A beam of light hits the flat test surface at the set angle of incidence and is reflected and/or scattered by this surface. A proportional electrical variable is displayed representing light beams hitting the photoelectronic detector. The value measured is dimensionless and must be stated together with the angle of incidence.

Glass Transition Temperature

Glass transition temperatures $T_g$ of the COCs were determined using film specimens with the aid of DSC (differential scanning calorimetry) (DIN 73 765). A Perkin-Elmer "Pyris" DSC instrument was used. The heating rate was 20 K/min and the specimen weight was about 12 mg. The glass transition $T_g$, was determined in the first heating procedure. Many of the specimens showed an enthalpy relaxation (a peak) at the beginning of the step-like glass transition. The temperature taken as $T_g$ was that at which the step-like change in heat capacity—without reference to the peak-shaped enthalpy relaxation—achieved half of its height in the first heating procedure. In all cases, only a single glass transition was observed in the thermogram in the first heating procedure.

Contact Angle with Water

The polarity of the surface was determined by measuring the contact angle of distilled water. The test took place at 23° C. and 50% r.h. A dispensing syringe was used to apply droplets of distilled water of width 1–2 mm to the film surface. The test is time-dependent due to heat introduced by the lighting (evaporation), and also due to charging or spread, and the therefore needle remains in the droplet so that during the test the droplet is carefully enlarged, and the contact angle is then immediately read off using a goniometer eyepiece. (Advancing angle measurement.) The average is calculated from 5 measurements.

The examples below serve for further illustration of the invention.

EXAMPLE 1

Chips of polyethylene terephthalate (prepared by the transesterification process using Mn as transesterification catalyst, Mn concentration: 100 ppm) were dried at 150° C. to a residual moisture level below 100 ppm and fed to the extruder for the base layer B. Alongside this, chips of ®Topas 6015 cycloolefin copolymer (COC) from Ticona (COC composed of 2-norbornene and ethylene, see also W. Hatke: Folien aus COC [COC Films], Kunststoffe 87 (1997) 1, pp. 58–62) with a glass transition temperature $T_g$ of about 160° C. were also fed to the extruder for the base layer B. The proportion of the cycloolefin copolymer (COC) in the base layer was 10% by weight.

Extrusion and stepwise longitudinal and transverse orientation, heat-setting, and then corona treatment (2 kW/m) was used to produce a white, opaque, single-layer film with a total thickness of 23 µm.

Base layer B, a mixture of:

| | |
|---|---|
| 90.0% | by weight of polyethylene terephthalate homopolymer with SV 800 |
| 10.0% | by weight of cycloolefin copolymer (COC) from Ticona, Topas 6015 |

The production conditions for each of the steps of the process were:

| | | |
|---|---|---|
| Extrusion: | Base layer temperatures: | 280° C. |
| | Temperature of take-off roll: | 30° C. |
| Longitudinal stretching: | Temperature: | 80 to 125° C. |
| | Longitudinal stretching ratio: | 4.2 |

| | | |
|---|---|---|
| Transverse stretching: | Temperature: | 80 to 135° C. |
| | Transverse stretching ratio: | 4.0 |
| Setting: | Temperature: | 230° C. |
| | Duration: | 3 s |

The film had the required good properties and the desired handling, and the desired processing performance. The properties achieved in films produced in this way are shown in Table 2.

EXAMPLE 2

The film was produced as in Example 1 but without corona treatment after biaxial stretching. The following process was used to apply a latex with 4.5% by weight solids content, composed of a copolymer made from 60% by weight of methyl methacrylate, 35% by weight of ethyl acrylate and 5% by weight of N-methylolacrylamide, and a surfactant, as an adhesion-promoter coating for a polyester film:

The longitudinally stretched film was corona-treated (8 kW/m) and then coated with the latex described above by reverse gravure coating.

The biaxially stretched film was heat-set at 230° C. The dry weight of the coating was about 0.035 g/m² and the coating thickness was about 0.0025 µm.

The film was tested for reprographic adhesion and gave good adhesion.

EXAMPLE 3

The film was produced as in Example 2. The following process was used to apply an aqueous dispersion with 6% by weight of copolyester, composed of 95 mol % of isophthalate, 5 mol % of Na 5-sulfoisophthalate, and 100 mol % of ethylene glycol, and 0.56% by weight of colloidal $SiO_2$, as a coating for a polyester film:

The longitudinally stretched film was coated with the copolyester dispersion described above, by reverse gravure coating.

The biaxially stretched film was heat-set at 230° C. The dry weight of the coating was about 0.030 g/m², and the coating thickness was about 0.0025 μm.

Two specimens of the resultant single-side-coated film were introduced in a laboratory vacuum coater, in such a way that the coated side of one of the specimens was metallized, and the uncoated side of the other. The vacuum chamber was evacuated to below $10^{-4}$ torr and about 500 Å of aluminum were vapor-coated from a tungsten filament onto the uncoated side and also onto the coated specimen.

Within 30 sec after removal from the vacuum chamber, each specimen was tested for "metal abrasion". To this end, the metal surface of each specimen studied was rubbed gently with a cotton nonwoven, using the same number of strokes and approximately the same pressure. The "abrasion performance" of the coated side of the film was evaluated as good.

EXAMPLE 4

The film was produced as in Example 1, but without corona treatment after the biaxial stretching. The following process was used to apply an aqueous dispersion with 7% by weight solids content, composed of 50% by weight of the aromatic copolymer A1 (copolyester containing 90 mol % of terephthalate, 10 mol % of sodium 5-sulfoisophthalate, 80 mol % of ethylene glycol, and 20 mol % of diethylene glycol), 45% by weight of the water-dispersible polymer B2 (polyvinyl alcohol with a degree of hydrolysis of 88 mol % and a degree of polymerization of 1700), and 5% by weight of inert particles D1 (colloidal $SiO_2$ with a particle diameter of 0.05 μm), as a coating of a polyester film:

The longitudinally stretched film was coated with the copolyester dispersion described above, by reverse gravure coating. The dry weight of the coating was about 0.040 g/m², and the coating thickness was about 0.05 μm.

To assess the adhesion-promoting action of the coating, an aqueous polyvinyl acetal solution (S-Lec KX-1, produced by Sekisui Chemical Co., Ltd.; termed KX-1 below) was applied to the coated film and dried. The concentration of the coating solution was 8% by weight and it was applied at a layer thickness of 127 μm, using a Baker-type applicator. The coated film was directly placed in an oven for drying at 100° C. for 4 minutes. An ink-jet printer (BJC-600J, Canon Inc.) was used to print a black square (area: 12×12 cm) on the surface of the dried KX-1 coating, and the ink was dried for 12 hours in air at 23° C. and 50% relative humidity. An adhesive tape (Cello-tape, Nichiban Inc. width: 18 mm) was applied to the printed area and rapidly pulled away. The extent of the printed surface removed with the adhesive tape was determined visually. The coated surface exhibited good adhesion properties.

COMPARATIVE EXAMPLE 1

A film was produced as in Example 1, but without corona treatment. The contact angle with respect to water was 65.5°, and the adhesion to metal was poor.

The invention claimed is:

1. An opaque, biaxially oriented polyester film comprising at least one layer, wherein at least this layer comprises from about 2 to about 60% by weight, based on this layer, of a cycloolefin copolymer (COC), wherein the glass transition temperature of the cycloolefin copolymer (COC) is in the range from about 70 to about 270° C., and wherein at least one surface of the film has an adhesion promoter and the film exhibits an average surface roughness, Ra, ranging from 70 to 200 nm.

2. The polyester film as claimed in claim 1, wherein the cycloolefin copolymer (COC) comprises polynorbornene, polydimethyloctahydronaphthalene, polycyclopentene, or poly(5-methyl)norbornene.

3. The polyester film as claimed in claim 1, wherein the cycloolefin copolymer (COC) has a glass transition temperature in the range from about 90 to about 250° C.

4. The polyester film as claimed in claim 1, wherein the cycloolefin copolymer (COC) has a glass transition temperature in the range from about 110 to about 220° C.

5. The polyester film as claimed in claim 1, which has an opacity of more than about 55%.

6. The polyester film as claimed in claim 1, which has a whiteness of more than about 70%.

7. The polyester film as claimed in claim 1, which has a gloss of more than about 50.

8. The polyester film as claimed in claim 1, wherein the layer comprises from about 0.5 to about 25% by weight based on the weight of the layer of one or more of a vacuole-initiating filler, a white filler, and a pigment.

9. The polyester film as claimed in claim 1, wherein an additional outer layer is arranged on the COC-containing layer.

10. The polyester film as claimed in claim 9, wherein an intermediate layer is arranged between the COC-containing layer and the outer layer.

11. The polyester film as claimed in claim 1, wherein at least one surface of the film which has an adhesion promoter has been corona-treated.

12. The polyester film as claimed in claim 11, wherein the surface which has the adhesion promoter has a contact angle of $\leqq 64°$ with respect to water.

13. The polyester film as claimed in claim 1, wherein at least one surface of the film bears an adhesion-promoter layer.

14. The polyester film as claimed in claim 13, wherein the adhesion-promoter layer comprises a polyester.

15. The polyester film as claimed in claim 13, wherein the adhesion-promoter layer is an acrylate coating.

16. The polyester film as claimed in claim 13, wherein the adhesion-promoter layer is a hydrophilic coating.

17. The polyester film as claimed in claim 1, which has an opacity of more than about 60%, and wherein at least one surface of the film has a contact angle of $\leqq 64°$ with respect to water.

18. The polyester film as claimed in claim 1, which has a whiteness of more than about 70%, and wherein at least one surface of the film has a contact angle of $\leqq 64°$ with respect to water.

19. The polyester film as claimed in claim 1, which has a gloss of more than about 50, and wherein at least one surface of the film has a contact angle of $\leqq 64°$ with respect to water.

20. A process for producing a film as claimed in claim 1, which comprises extruding through a flat-film die the melt or the melts corresponding to the individual layers of the film, drawing off the resultant film on one or more rolls for solidification, then biaxially stretching (orienting) the film, heat-setting the biaxially stretched film, and, either coating the film between extrusion and heat-setting, or corona- or flame-treating the film after heat-setting, on the surface intended for treatment or coating the film between extrusion once heat-setting and corona-or flame-treating the film after heat-setting, on the surface intended for treatment.

21. Method of making an interior surfacing, a protective surfacing, a packaging film, a hot-stamping foil or a label foil, which method comprises converting a film as claimed in claim 1 into an interior surfacing, a protective surfacing, a packaging film, a hot-stamping foil, or a label foil.

22. Method of making a laminate, an image-recovery paper, a print of feedstock or a magnetic recording card, which method comprises converting a film as claimed in claim 1 into a laminate or an image-recording paper, a print feedstock, or a magnetic recording card.

23. The polyester film as claimed in claim 1, wherein the film contains recycle formed from said film, present in an amount of from 10 to 70% by weight, based on the total weight of the film.

24. The polyester film as claimed in claim 1, wherein said surface roughness is imparted in the absence of anti-blocking agents within said layer.

* * * * *